(12) United States Patent
Zaimeddine

(10) Patent No.: US 10,044,315 B2
(45) Date of Patent: Aug. 7, 2018

(54) SYSTEMS AND METHODS FOR MITIGATING RESONANCE IN LONG CABLE DRIVES

(71) Applicant: ONESUBSEA IP UK LIMITED, London (GB)

(72) Inventor: Rabah Zaimeddine, Straumsgrend (NO)

(73) Assignee: ONESUBSEA IP UK LIMITED, London (GB)

( * ) Notice: Subject to any disclaimer, the term of this patent is extended or adjusted under 35 U.S.C. 154(b) by 0 days.

(21) Appl. No.: 15/211,544

(22) Filed: Jul. 15, 2016

(65) Prior Publication Data

US 2018/0019699 A1 Jan. 18, 2018

(51) Int. Cl.
| | |
|---|---|
| H02P 7/00 | (2016.01) |
| H02P 29/50 | (2016.01) |
| H02P 21/24 | (2016.01) |
| H02P 27/06 | (2006.01) |
| H02P 21/05 | (2006.01) |

(52) U.S. Cl.
CPC .............. *H02P 29/50* (2016.02); *H02P 21/05* (2013.01); *H02P 21/24* (2016.02); *H02P 27/06* (2013.01)

(58) Field of Classification Search
USPC .................................. 318/632, 432, 629, 813
See application file for complete search history.

(56) References Cited

U.S. PATENT DOCUMENTS

| | | | | |
|---|---|---|---|---|
| 6,184,638 B1 * | 2/2001 | Kinpara | ................... | H02P 21/16 318/432 |
| 8,344,671 B2 * | 1/2013 | Tobari | ..................... | H02P 6/085 318/400.02 |
| 8,624,530 B2 * | 1/2014 | Chung | .................. | H02J 3/1878 166/250.15 |

(Continued)

FOREIGN PATENT DOCUMENTS

| | | |
|---|---|---|
| EP | 2779414 A2 | 9/2014 |
| WO | 2011128695 A2 | 10/2011 |

OTHER PUBLICATIONS

Extended European Search Report for EP Application No. 17181739 dated Nov. 21, 2017; 10 Pages.

*Primary Examiner* — Jorge L Carrasquillo
(74) *Attorney, Agent, or Firm* — Fletcher Yoder, P.C.

(57) ABSTRACT

A system includes a variable-speed drive configured to drive a motor, wherein the variable-speed drive is communicatively coupled to first and second resonant controllers. The system also includes a first transformer coupled to the variable-speed drive and an umbilical cable, wherein the first transformer increases a first voltage output by the variable-speed drive. The system further includes a second transformer coupled to the umbilical cable and the motor, wherein the second transformer decreases a second voltage output by the first transformer. The first resonant controller compensates for a harmonic order of the system by adjusting a magnetizing current used to control an operation of the variable-speed drive based on a modeled resonance frequency of the system. The second resonant controller compensates for the harmonic order of the system by adjusting a torque current used to control the operation of the variable-speed drive based on the modeled resonance frequency.

19 Claims, 7 Drawing Sheets

(56) References Cited

U.S. PATENT DOCUMENTS

| | | | |
|---|---|---|---|
| 2009/0212724 A1* | 8/2009 | Osman | H02P 3/22 318/381 |
| 2012/0205981 A1* | 8/2012 | Varma | H02J 3/01 307/64 |
| 2012/0319628 A1* | 12/2012 | Rongve | H02P 23/14 318/400.02 |
| 2014/0306641 A1* | 10/2014 | Igarashi | G05B 17/02 318/561 |
| 2015/0127202 A1* | 5/2015 | Itou | B60L 15/20 701/22 |
| 2016/0173018 A1 | 6/2016 | Nondahl et al. | |

* cited by examiner

SYSTEMS AND METHODS FOR MITIGATING RESONANCE IN LONG CABLE DRIVES

BACKGROUND

The present disclosure relates generally to electro-mechanical drives and long cable transmission. More particularly, the present disclosure relates to mitigating harmonic interaction between variable-speed drives (VSDs) and long cable transmission used to provide power to a load.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

High power drives (such as VSDs) are useful in power systems of subsea applications to drive a load, such as a motor. VSD systems may be particularly advantageous because such systems may incorporate a variety of power electronics topologies systems. However, using the VSD systems may generate harmonics that interfere with other equipment of the VSD system due to the inductance components within the VSD systems.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to methods and systems for mitigating harmonic interaction between a variable-speed drive (VSD) and long cable transmission in a power system used to provide power to a subsea load. The methods and systems of the present disclosure mitigate the harmonic interaction by compensating for dominant harmonics in the power system. In particular, two resonant controllers may be in parallel with two respective controllers of the power system that control a magnetizing current and a torque current of the VSD, respectively. The two resonant controllers may apply a transfer function that may be tuned for one or more specified harmonic orders (e.g., a $6^{th}$ and/or a $12^{th}$ harmonic order) to the magnetizing current and/or the torque current. The transfer function may adjust the magnetizing and/or the torque current of the VSD such that the harmonic interaction between the VSD and the long cable transmission is mitigated.

Various refinements of the features noted above may be made in relation to various aspects of the present disclosure. Further features may also be incorporated in these various aspects as well. These refinements and additional features may be made individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

Figure 1:
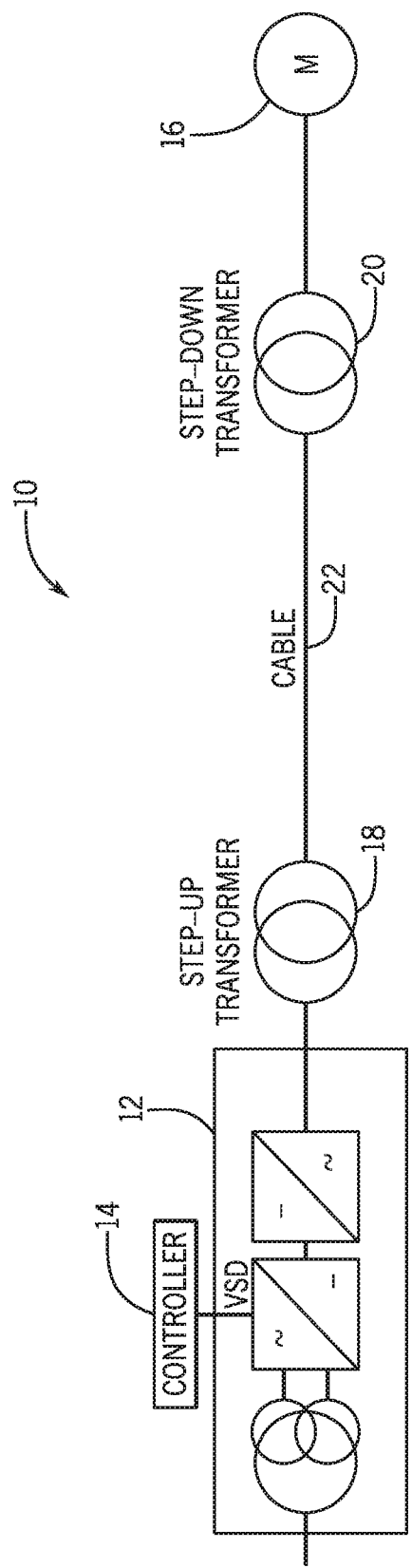
FIG. 1 is a block diagram of a power system in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The drawing figures are not necessarily to scale. Certain features of the embodiments may be shown exaggerated in scale or in somewhat schematic form, and some details of conventional elements may not be shown in the interest of clarity and conciseness. Although one or more embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

When introducing elements of various embodiments of the present disclosure, the articles "a," "an," and "the" are intended to mean that there are one or more of the elements. The terms "comprising," "including," and "having" are used in an open-ended fashion, and thus should be interpreted to mean "including, but not limited to . . . ." Any use of any form of the terms "connect," "engage," "couple," "attach," "mate," "mount," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," "upper," "lower," "up," "down," "vertical," "horizontal," "first," "second," "inner," "outer," and variations of these terms is made for convenience but does not require or imply any particular orientation, number, or prominence of these components.

Certain terms are used throughout the description and claims to refer to particular features or components. As one skilled in the art will appreciate, different persons may refer to the same feature or component by different names. This document does not intend to distinguish between components or features that differ in name but not function, unless specifically stated.

Embodiments of the present disclosure relate generally to electro-mechanical drives and long cable transmission. More particularly, the present disclosure relates to mitigating harmonic interaction between variable-speed drives (VSDs) and long cable transmission used to provide power to a subsea load. The methods and systems of the present disclosure mitigate the harmonic interaction by compensating for dominant harmonics in the power system. In particular, two resonant controllers may be added in parallel to two controllers of the power system that control a flux and a motor speed of the power system, respectively. In one example, the two resonant controllers may apply a transfer function to the VSD that may be tuned to compensate for dominant harmonics of the power system, such as a $6^{th}$ and/or a $12^{th}$ harmonic order, thereby mitigating the harmonic interaction within the power system. Additional details with regard to compensating for dominant harmonics in the power system will be discussed below with reference to FIGS. 1-7.

A subsea power system may be used in various applications, such as in the marine biology, undersea geology, offshore oil and gas, underwater mining, and offshore wind power industries. For example, oil and gas fields may reside beneath inland waters or offshore areas around the world. The subsea power system may enable power to be delivered to oil and gas exploration, drilling, and development in underwater locations. While a motor may power subsea components at the subsea surface, a drive (e.g., the VSD) that controls alternating current (AC) motor speed and torque of the motor by varying input frequency and voltage to the motor, may be located topside. The VSD may communicate with the motor via a long cable, and transformers may be used to adjust the voltage in the long cable. In this manner, the topside VSD may drive the subsea motor to provide power to components at the subsea surface.

By way of introduction, FIG. 1 is a block diagram of an example power system 10 in accordance with an embodiment of the present disclosure. The power system 10 may include an electro-mechanical drive, such as the variable-speed drive (VSD) 12, which is a type of adjustable-speed drive. A controller 14 communicatively coupled to the VSD 12 may instruct the VSD 12 to adjust an input AC voltage, which may control an AC motor 16. In some instances, the speed and torque of the motor 16 may be controlled by varying input frequency and voltage provided to the motor 16 via the VSD 12. The motor 16 may then, for example, drive a pump or compressor of a subsea application.

To provide voltage to the motor 16, the VSD 12 may output power to a step-up transformer 18. The step-up transformer 18 may increase an input voltage provided to the step-up transformer 18. In one embodiments, the step-up transformer 18 may be located at a topside (or surface side) of a subsea application. The step-up transformer 18 may be coupled to a step-down transformer 20 that may decrease voltage provided to the step-down transformer 20, via an umbilical cable 22. The cable 22 may be deployed from the surface to the seabed (ocean floor) to supply control, energy (e.g., electric and/or hydraulic), and/or chemicals, to subsea oil and gas wells, subsea manifolds, and/or any subsea system using remote control, such as a remotely operated vehicle. The cable 22 may also be used for offshore drilling or workover activities. The step-down transformer 20 may be located at a subsea surface of the subsea application. The step-down transformer 20 may be coupled to the motor 16, also located at the subsea surface.

As mentioned above, the VSD 12 may generate harmonics that interfere with other equipment of the power system 10. Harmonics are current or voltage waveforms in the power system 10 that operate at a multiple of the frequency of the power system 10. For instance, a $5^{th}$ harmonic or a harmonic order h of 5 of the power system 10 operates at five times the nominal frequency ($f_n$) of the power system 10. In certain subsea operations, a three-phase VSD 12 may inject $5^{th}$, $7^{th}$, $11^{th}$, and $13^{th}$ harmonics into a respective downstream network. When dominant output harmonic voltages coincide with resonant points of the power system 10, the magnitudes of these harmonics are amplified. As a consequence, the total harmonic distortion at a subsea end of the umbilical cable 22 is higher and may exceed acceptable levels and may reduce the lifetime of the power system components (e.g., the step-down transformer 20, the motor 16, and/or the cable 22) at the subsea end of the umbilical cable 22.

The power system 10 above includes several inductive components, such as the cable 22, the transformers 18, 20, and the subsea motor 16. The corresponding aggregate inductive impedance provokes attenuation of the high frequencies due to the harmonics produced by the VSD 12. However, interaction of the inductive components of the power system 10 with a capacitive component of the cable 22 may cause resonances at different frequencies. That is, the longer the cable 22, the lower the resonant frequency, which may reduce the lifetime of the cable 22 and/or the motor 16. As such, embodiments of the present disclosure relate to using resonant controllers to mitigate the harmonic interaction of the power system 10, such that excitation of the resonances of the power system 10 are reduced.

Figure 2:
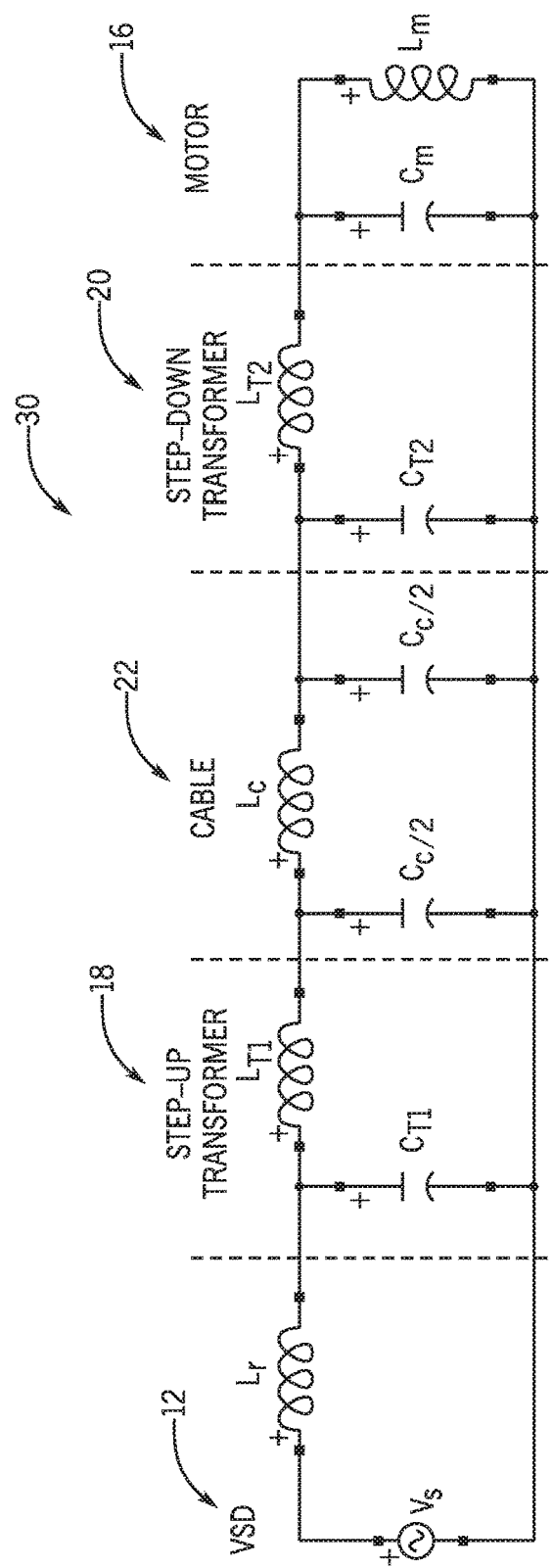
FIG. 2 is a simplified equivalent single phase circuit diagram for modeling the power system of FIG. 1, in accordance with an embodiment of the present disclosure.

Frequency response analysis of power systems shows that resonance frequencies are based on a variety of factors, such as power system configuration, cable characteristics, cable length, short circuit impedance of an output inverter, leakage reactance of transformers, impedance of a cable, stray capacitance to ground of power system components, primary to secondary coupling capacitance of the transformers, motor impedance, and the like. With this in mind, FIG. 2 is a simplified equivalent single phase circuit diagram 30 for modeling the power system 10 of FIG. 1, in accordance with an embodiment of the present disclosure. The circuit 30 represents the VSD 12 as a voltage source Vs and a short circuit impedance $L_r$ of an output inverter of the VSD 12. The circuit 30 also represents the step-up transformer 18 as an equivalent leakage inductance $L_{T1}$ and a stray capacitance to ground $C_{T1}$ of the step-up transformer 18. Similarly, the circuit 30 represents the step-down transformer 20 as an equivalent leakage inductance $L_{T2}$ and a stray capacitance to ground $C_{T2}$ of the step-down transformer 20. For resonance frequency calculation, a lumped parameters model may be used for the cable 22. As such, the circuit 30 represents the cable 22 as a cable inductance $L_C$ and two cable capacitances $C_C/2$. The circuit 30 also represents the motor 16 as a motor capacitance $C_m$ and a total motor inductance $L_m$.

The circuit 30 may be used to calculate harmonics of the power system 10. In particular, the circuit 30 may represent a single section of a capacitor-input ("PI") filter, such that a number N of PI sections may correspond to a first resonance frequency according to the power system components (e.g., the transformers 18, 20, the cable 22, the motor 16, and the like). The number N of PI sections may be approximated according to Equation 1 below:

$$N \approx 8 * \text{length} * \sqrt{L_c \cdot C_c} \cdot f_{max} \qquad (1)$$

where:
 N is the number of PI sections;
 length is the length (in kilometers (km)) of the cable 22;
 $L_C$ is the inductance (in henries (H)/km) of the cable 22;
 $C_C$ is the capacitance (in farads (F)/km) of the cable 22; and
 $f_{max}$ is the maximum frequency covered by one PI section of the circuit 30 (in hertz (Hz)).

The parameters of the circuit 30 may be dependent on component design and frequency range of the power system 10. The transformers 18, 20 may behave as open circuits for a switching frequency. As such, the primary to the secondary coupling capacitance may not be considered at this range of frequencies.

Figure 3:
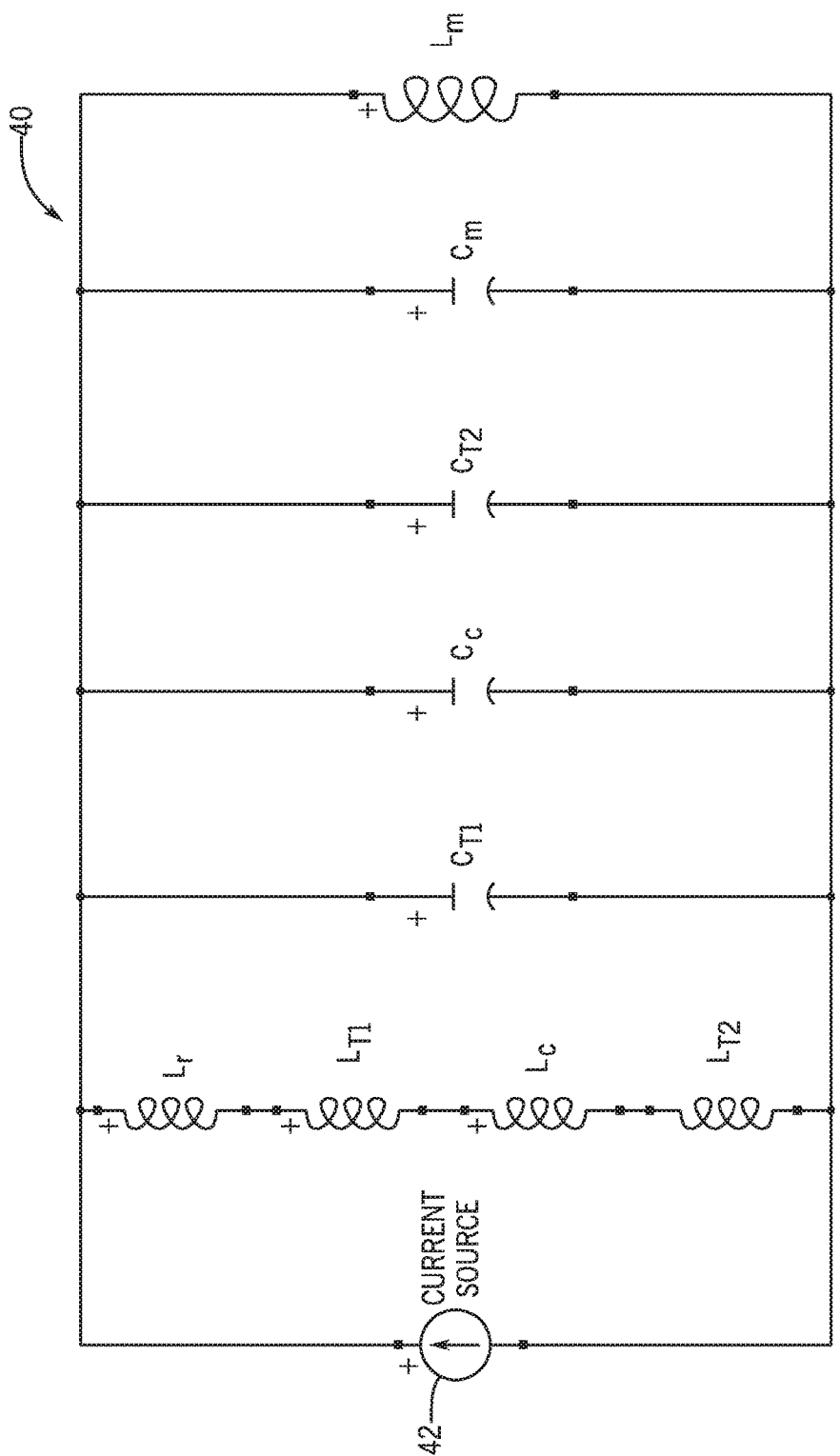
FIG. 3 is a simplified equivalent circuit for modeling current harmonics in the power system of FIG. 1, in accordance with an embodiment of the present disclosure.

The first resonance frequency may be approximated based at least in part on considering secondary side leakage inductance for the step up transformer 18 and primary side leakage inductance of the step-down transformer 20, which will directly interact with the cable capacitance. FIG. 3 is a simplified equivalent circuit 40 for modeling current harmonics in the power system 10 of FIG. 1, in accordance with an embodiment of the present disclosure. The voltage source and the total inductance of the power system 10 are represented by the Thevenin equivalent current source 42.

For frequencies in the kilohertz range, it may be desirable to include stray capacitances (e.g., phase to earth). As mentioned above, cable capacitance may interact with the inductive components of the power system 10 that may have a more significant influence on resonance estimation than resistance. As such, by neglecting resistances, the equivalent circuit 40 for modeling current harmonics in the power system 10 may be approximated as shown in FIG. 3.

Based on the circuit 40, a first parallel resonance frequency, $f_{r1}$, may be expressed by Equation 2 as follows:

$$f_{r1} \approx \frac{1}{2\pi \sqrt{\frac{(L_r + L_{T1} + L_c + L_{T2}) * L_m}{(L_r + L_{T1} + L_c + L_{T2}) + L_m} * (C_{T1} + C_c + C_{T2} + C_m)}} \qquad (2)$$

In some embodiments, due to characteristics and/or components of the power system 10, harmonic interaction at the first resonance, $f_{r1}$, of the power system 10 may exceed acceptable levels and may reduce the lifetime of the power system components (e.g., the step-down transformer 20, the motor 16, and/or the cable 22) at the subsea end of the umbilical cable 22 at a greater rate than harmonics generated by the VSD 12. Amplification at the first resonance frequency and voltage distortion may hinder operability of the power system 10. In such embodiments, resonant controller(s) describe in detail below may compensate for and overcome the harmonic interaction at the first resonance instead of using, for example, a damping resistor in a VSD output filter. For example, the resonant controller(s) may be tuned for a specific resonance (e.g., the first parallel resonance frequency, $f_{r1}$) in the power system 10 as the resonant controller(s) may be tuned for dominant harmonics.

Figure 4:
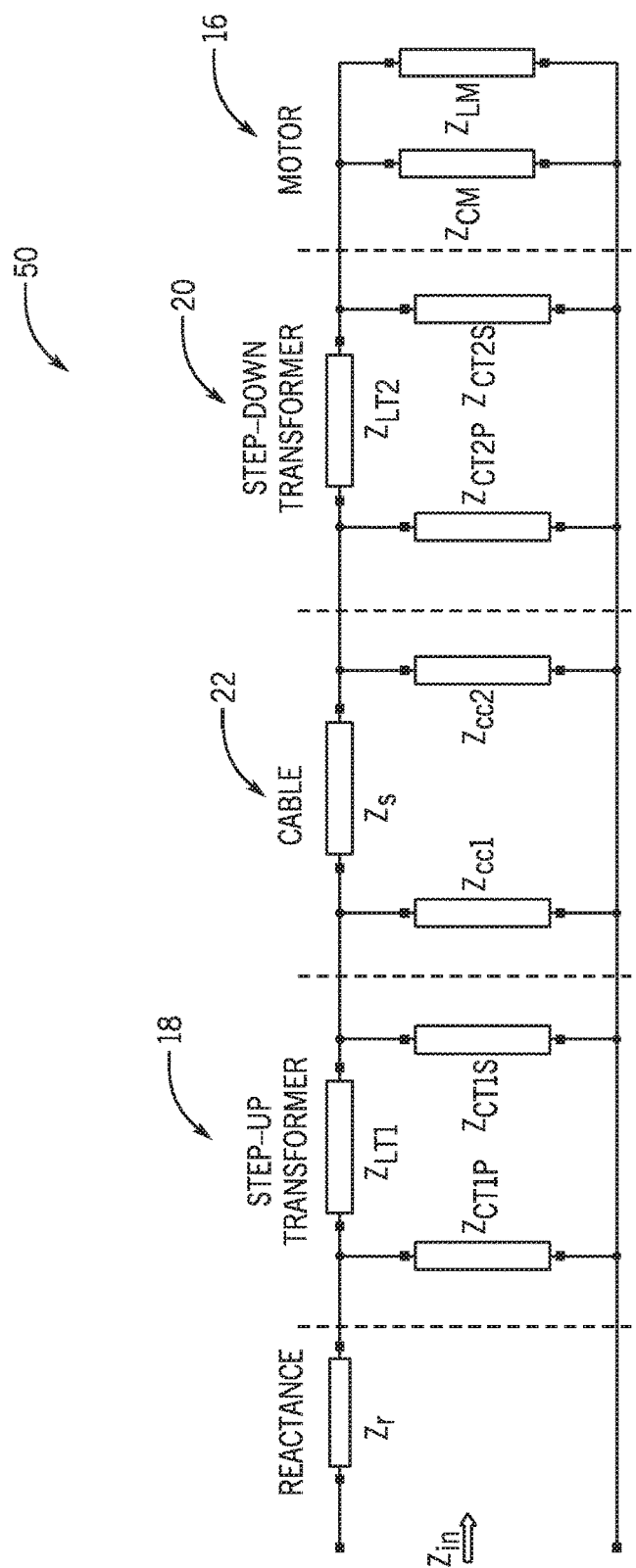
FIG. 4 is an equivalent circuit as seen from a variable-speed drive of FIG. 1 for calculating impedance based on the circuit of FIG. 2, in accordance with an embodiment of the present disclosure.

FIG. 4 is an equivalent impedance circuit 50 as seen from the VSD 12 of FIG. 1 for calculating impedance based on the circuit 30 of FIG. 2, in accordance with an embodiment of the present disclosure. Cable shunt conductance ($G_c$) as it pertains to the circuit 50 is considered small enough that it may be neglected for materials used in cable insulation. As such, the impedances identified in the circuit 50 may be determined based on angular frequency ($\omega$) using Equations 3-14 as follows:

$$Z_r = j\omega L_r \qquad (3)$$

$$L_{LT1} = j\omega L_{T1} \qquad (4)$$

$$Z_{CT1p} = -j\frac{1}{\omega \cdot C_{T1P}} \qquad (5)$$

$$Z_{CT1s} = -j\frac{1}{\omega \cdot C_{T1S}} \qquad (6)$$

$$Z_s = (R_c + j\omega L_c) \cdot l \cdot \frac{\sinh(\gamma \cdot l)}{\gamma \cdot l} \qquad (7)$$

$$Z_{cc1} = Z_{cc2} = -j\frac{2}{\omega C_c \cdot l} \cdot \left(\frac{\tanh\left(\gamma \cdot \frac{l}{2}\right)}{\gamma \cdot \frac{l}{2}}\right)^{-1} \qquad (8)$$

$$\gamma = \sqrt{(R_c + j\omega L_c) \cdot (j\omega C_c)} \qquad (9)$$

$$Z_{LT2} = j\omega L_{T2} \qquad (10)$$

$$Z_{CT2p} = -j\frac{1}{\omega \cdot C_{T2P}} \qquad (11)$$

$$Z_{CT2s} = -j\frac{1}{\omega \cdot C_{T2S}} \qquad (12)$$

$$Z_{CM} = -j\frac{1}{\omega \cdot C_m} \qquad (13)$$

$$Z_{LM} = j\omega L_m \qquad (14)$$

where:
 l is the length (in km) of the cable; and
 y is a propagation constant (in 1/km).

The input impedance is then given by Equation 15 as follows:

$$Z_{IN} = Z_r + [Z_{CT1P} || [[Z_{LT1} + [Z_{CT1S} || Z_{CC1}]] \qquad (15)$$
$$|| [[[Z_S + [Z_{CC2} || Z_{CT2P}]]] || [Z_{LT2} + [Z_{CT2S} || Z_{CM} || Z_{LM}]]]]]$$

Rigorous calculation of the input impedance, $Z_{IN}$, may be performed using $T/\pi$ circuit transformation to identify resonances of the power system 10. In some embodiments, a technique based on a Two-Port network model for each component of the power system 10 may additionally be used to determine resonances of the power system 10, attenuation, distributed voltage along the umbilical power cable length, and reflections.

The resonance frequencies may be determined from the above expression using the relationship between impedance, angular frequency, and frequency (e.g., Equations 3-15 and $f=\omega/2\pi$). The resonance frequencies and/or impacts of the resonance frequencies may also be dependent on a switching frequency of the VSD 12. That is, the harmonics of the power system 10 may be greater in magnitude near some specific resonance frequencies based on, for instance, modulation technique and VSD topology. These resonance frequencies may result in harmful harmonic amplitudes on the power system 10 and/or components of the power system 10. As such, it may be desirable to perform frequency analysis on the power system 10 and identify resonance frequency ranges that may cause hazardous effects on the power system 10 and/or components of the power system 10.

When considering a harmonic current in a synchronous frame of reference (e.g., including a direct axis (d) and a quadrature axis (q)), compensating for the quantities of the harmonic current may be convenient because the quantities are direct current (DC) quantities in the reference (d, q). That is, for DC quantities of harmonic currents, two even-ordered harmonics or two odd-ordered harmonics may collapse into one harmonic. For instance, the $2^{nd}$ and 4th harmonics may become the $3^{rd}$ harmonic, the 5th and 7th harmonics may become 6th harmonic, the 11th and $13^{th}$ harmonics may become the 12th harmonic, and so on.

With the foregoing in mind, if the $6^{th}$ and $12^{th}$ harmonics are expected to be the DC quantities of harmonic currents present in the power system 10, two resonant controllers designed for the $6^{th}$ and $12^{th}$ harmonics may compensate for the dominant harmonics (e.g., the $5^{th}$, $7^{th}$, $11^{th}$, and $13^{th}$ harmonics) injected in the power system 10. Each resonant controller may act as a double integrator that performs a second order transfer function that provides a high gain at a particular frequency (e.g., the resonance frequency to be compensated for). Thus, the resonant controllers may efficiently mitigate the harmonic interaction in the power system 10.

If the VSD 12, which may be generally based on a multilevel inverter, has no output filter, two resonant controllers may sufficiently compensate for the dominant harmonics by tuning the two resonant controllers for the $6^{th}$ harmonic (e.g., 6*the nominal frequency ($f_n$) of the power system 10) and the $12^{th}$ harmonic (e.g., 12*$f_n$)). That is, the two resonant controllers may be tuned for a harmonic order that is, for example, between six to twelve times of the nominal frequency of the power system 10. The general transfer function for a resonant controller may be given by Equation 16 as follows:

$$FR = K_p + \frac{K_i}{s} + K_{ih}\sum_h \frac{s}{s^2 + (\omega_{0h})^2} \qquad (16)$$

where:
$K_p$ is the proportional gain;
$K_p$ is the integral gain;
$K_p$ is the compensator gain;
h is the harmonic order; and
$\omega_{0h}$ is the resonant frequency.

As such, with the exampled presented above in mind, one resonant controller may be designed with h=6 and another resonant controller with h=12. However, it should be noted that h may be selected for any suitable harmonic order depending on the harmonic currents of the power system 10 that may be present and/or dominant.

Non-ideal resonant controllers may be implemented by adding a pole in the transfer function of Equation 16 to realize Equation 17 as follows:

$$FR = K_p + \frac{K_i}{s} + K_{ih}\frac{\omega_c s}{s^2 + 2\omega_c s + \omega_{0h}^2} \qquad (17)$$

where $\omega_c$ is a cutoff frequency selected to overcome stability issues.

Figure 5:
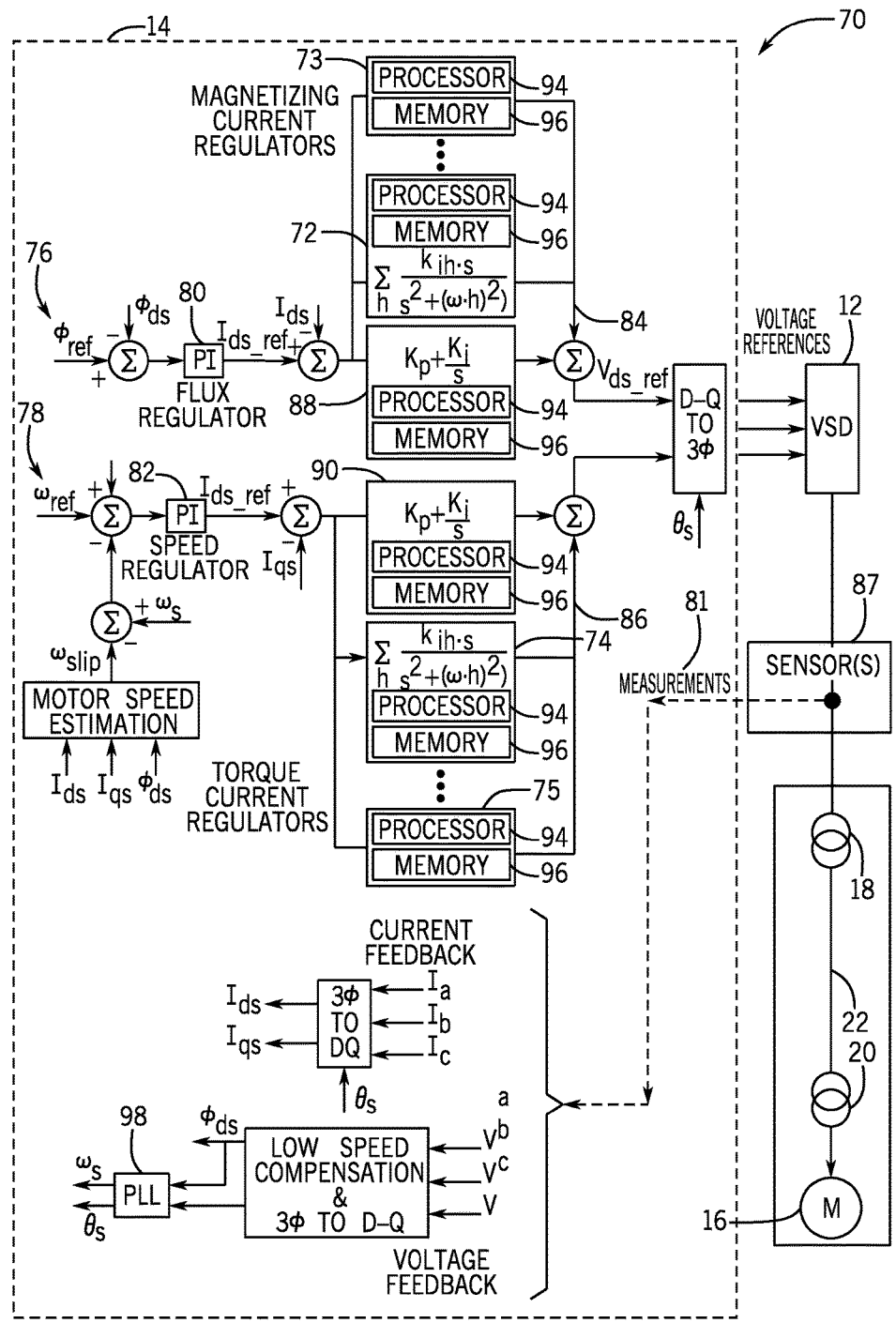
FIG. 5 is a block diagram of the power system of FIG. 1 that includes two resonant controllers, in accordance with an embodiment of the present disclosure.

FIG. 5 is a block diagram 70 of the power system 10 of FIG. 1 that includes the two resonant controllers 72, 74, in accordance with an embodiment of the present disclosure. The block diagram 70 includes a first external loop 76 that includes a proportional integral regulator 80 that receives a reference flux component ($\varphi_{ref}$) and a measured direct flux component ($\varphi_{ds}$) of the motor 16. The reference flux component may be determined based on modeling the power system 10. The measured direct flux component may be determined based at least in part on topside voltage measurements 81 (e.g., $V_a$, $V_b$, $V_c$) that correspond to outputs of the VSD 12. The topside voltage measurements 81 may be provided by the sensor(s) 87, which are located on the topside surface, rather than the subsea surface, and may be easier to access and less costly to implement due to subsea equipment operating in harsher environmental conditions. For example, the sensor(s) 87 may be coupled to an output of the VSD 12 located on the topside surface. The proportional integral regulator 80 may determine a reference direct current component ($I_{ds\_ref}$). A difference between the reference direct current component and a measured direct current component ($I_{ds}$) may be received by a first controller 88 and a first resonant controller 72.

The first controller 88 may determine a first magnetizing current adjustment component based at least in part on the reference direct current component and the measured direct current component. In some embodiments, the first magnetizing current adjustment component may be determined to correct for an error between the reference direct current component and the measured direct current component. The first resonant controller 72, which may be coupled to the first controller 88 in parallel, may determine a second magnetizing current adjustment component to compensate for one or more harmonic orders of the power system 10. The second magnetizing current adjustment component may be based at least in part on a transfer function as defined in Equation 16 or 17. In some embodiments, there may be multiple resonant controllers 72, 73 in parallel with the controller 88, wherein each resonant controller 72, 73 corresponds to a harmonic order of the power system. For example, there may be two resonant controllers 72, 73 in parallel with the controller 88, wherein one resonant controller 72 determines a magnetizing current adjustment to compensate for a $6^{th}$ harmonic, and another resonant controller 73 determines a magnetizing current adjustment to compensate for a $12^{th}$ harmonic. The first and second magnetizing current adjustment components may be combined to determine a reference direct voltage ($V_{ds\_ref}$).

The block diagram 70 includes a second external loop 78 that includes a proportional integral regulator 82 that receives a reference speed component ($\omega_{ref}$) and a measured speed component ($\omega_r$) of the motor 16. The reference speed component may be determined based on modeling the power system 10. The measured speed component may be determined based at least in part on topside voltage and current measurements 81 (e.g., $V_a$, $V_b$, $V_c$, $I_a$, $I_b$, $I_c$) that correspond to outputs of the VSD 12. The proportional integral regulator 82 may determine a reference quadrature current component ($I_{as\_ref}$). A difference between the reference quadrature current component and a measured quadrature current component ($I_{qs}$) may be received by a second controller 90 and a second resonant controller 74.

The second controller 90 may determine a first torque current adjustment component based at least in part on the reference quadrature current component and the measured quadrature current component. In some embodiments, the first torque current adjustment component may be determined to correct for an error between the reference quadrature current component and the measured quadrature current component. The second resonant controller 74, which may be coupled to the second controller 90 in parallel, may determine a second torque current adjustment component to compensate for one or more harmonic orders of the power system 10. The second reference quadrature current component and the measured quadrature current component current adjustment component may be based at least in part on a transfer function as defined in Equation 16 or 17. In some embodiments, there may be multiple resonant controllers 74, 75 in parallel with the second controller 90, wherein each resonant controller 74, 75 corresponds to a harmonic order of the power system. For example, there may be two resonant controllers 74, 75 in parallel with the second controller 90, wherein one resonant controller 74 determines a torque current adjustment to compensate for a $6^{th}$ harmonic, and another resonant controller 75 determines a torque current adjustment to compensate for a $12^{th}$ harmonic. The first and second torque current adjustment components may be combined to determine a reference quadrature voltage ($V_{qs\_ref}$). The direct and quadrature components of the voltage reference ($V_{ds\_ref}$, $V_{qs\_ref}$) may be converted to phase values (e.g., using a direct-quadrature to three phase converter) and applied to the VSD 12 to mitigate harmonic interactions of the power system 10.

In some embodiments, the resonant controllers 72, 74 may be provided in the same form as the controllers 88, 90. For instance, each of the resonant controllers 72, 74 and the controllers 88, 90 may include a processor(s) 94 (e.g., a microprocessor(s)) that may execute software programs to compensate for the dominant harmonics. Moreover, the processor 94 may include multiple microprocessors, one or more "general-purpose" microprocessors, one or more special-purpose microprocessors, and/or one or more application specific integrated circuits (ASICS), or some combination thereof. For example, the processor 94 may include one or more reduced instruction set (RISC) processors. The resonant controllers 72, 74 and the controllers 88, 90 may include a memory device 96 that may store information such as control software, look up tables, configuration data, etc. The memory device 96 may store the disclosed methods or techniques for compensating for the dominant harmonics, such as any combination of portions of Equations 16 and/or 17. The memory device 96 may include a tangible, non-transitory, machine-readable medium, such as a volatile memory (e.g., a random access memory (RAM)) and/or a nonvolatile memory (e.g., a read-only memory (ROM)). The memory device 96 may store a variety of information and may be used for various purposes. For example, the memory device 96 may store machine-readable and/or processor-executable instructions (e.g., firmware or software) for the processor to execute, such as instructions for applying the disclosed methods or techniques for compensating for the dominant harmonics. The storage device(s) (e.g., nonvolatile storage) may include read-only memory (ROM), flash memory, a hard drive, or any other suitable optical, magnetic, or solid-state storage medium, or a combination thereof. The storage device(s) may store any suitable data and/or instructions. In some embodiments, the resonant controllers 72, 74 and the controllers 88, 90 may share one or more processors 94 and/or one or more memory device 96. In some embodiments, the resonant controllers 72, 74 and the controllers 88, 90 may be components of the controller 14 of FIG. 1.

Phase locked loop circuitry 98 may be included to extract a transformation angle based at least in part on the topside voltage measurements ($V_a$, $V_b$, $V_c$) to transform the direct and quadrature flux components ($\varphi_{ds}$, $\varphi_{qs}$) to rotating coordinates ($\omega_s$, $\theta_s$), without using a mechanical encoder or subsea measurements. As such, the compensation for the dominant harmonics performed by the resonant controllers 72, 74 without the use of additional hardware or measuring at the subsea surface that may be expensive and difficult to perform.

Figure 6:
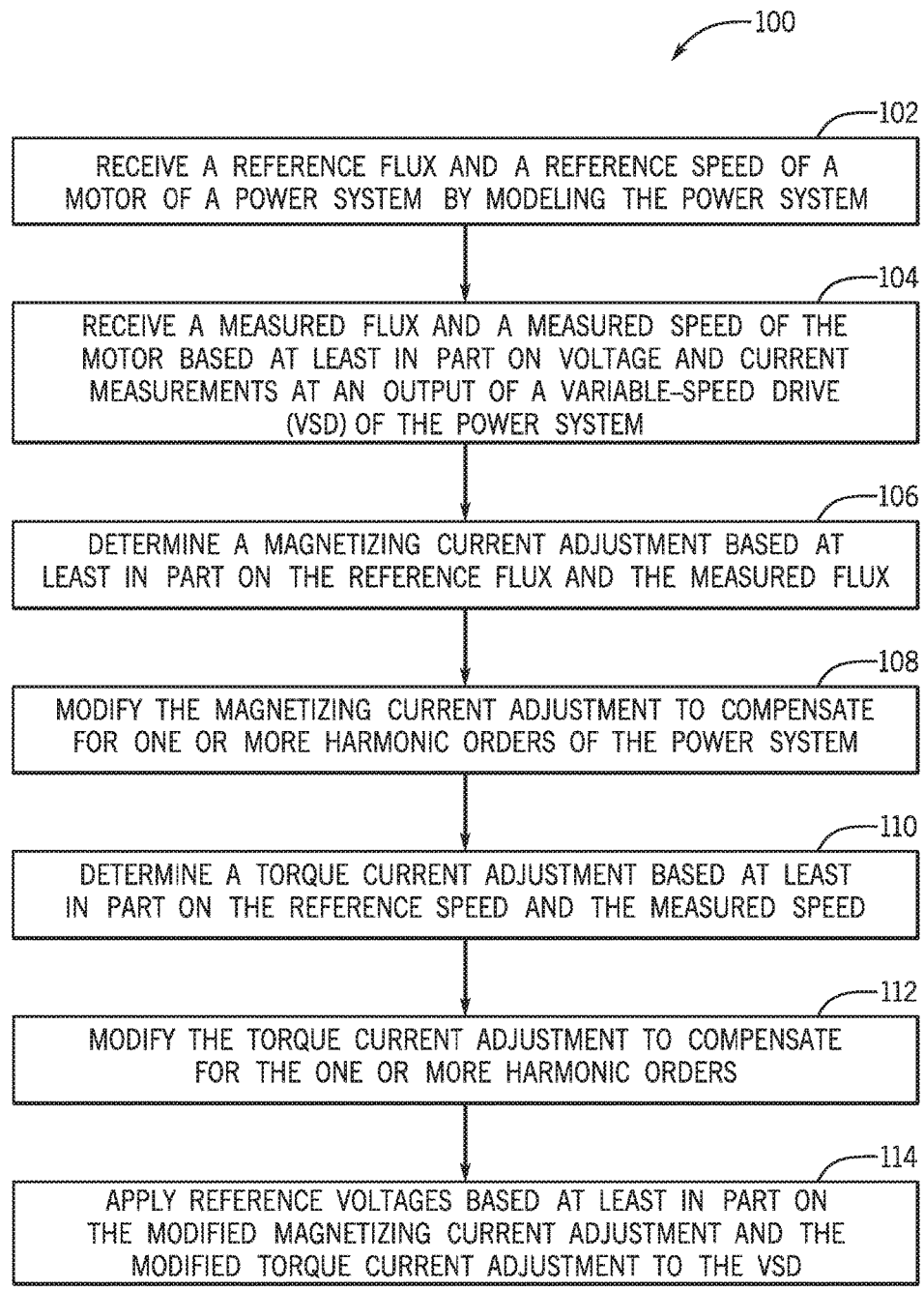
FIG. 6 is a flowchart of a method for mitigating harmonic interaction of the power system of FIG. 1, in accordance with an embodiment of the present disclosure.

FIG. 6 is a flowchart of a method 100 for mitigating harmonic interaction in the power system 10 of FIG. 1, in accordance with an embodiment of the present disclosure. The method 100 may be performed by one or more processors 94 of the resonant controllers 72, 74 and the controllers 88, 90. In some embodiments, the method 100 may be performed by one or more processors (e.g., 94) of the controller 14. Although the method 100 is described in a particular order, it should be noted that the method 100 may be performed in any suitable order.

The one or more processors 94 may receive (block 102) a reference flux ($\varphi_{ref}$) and a reference speed ($\omega_{ref}$) of the motor 16. The reference flux and the reference speed may be determined by modeling the power system 10. The one or more processors 94 may also receive (block 104) a measured flux ($\varphi_{ds}$) and a measured speed ($\omega_r$) of the motor 16 based at least in part on voltage and current measurements 81 at an output of the VSD 12. In some embodiments, the voltage and current measurements 81 may be collected by the sensor(s) 87 coupled to the output of the VSD 12 located at the topside surface. The sensor(s) 87 may include voltage and/or current sensor(s) communicatively coupled to the controllers 88, 90 and/or the resonant controllers 72, 74. The sensor(s) 87 are located on the topside surface, rather than the subsea surface, and may be easier to access and less costly to implement due to subsea equipment operating in harsher environmental conditions.

The one or more processors 94 may determine (block 106) a magnetizing current adjustment based at least in part on the reference flux and the measured flux of the motor 16. The magnetizing current adjustment may be determined by the processor 94 of the controller 88 to correct for an error between the reference flux and the measured flux. The one or more processors 94 may then modify (block 108) the magnetizing current adjustment to compensate for one or more harmonic orders of the power system 10. The magnetizing current adjustment may be modified based at least in part on a transfer function as defined in Equation 16 or 17.

For example, if the power system 10 includes a dominant 6$^{th}$ harmonic, the magnetizing current adjustment may be modified based at least in part on the transfer function with h=6. The transfer function may be based at least in part on one or more modeled resonance frequencies determined via Equation 15. In some embodiments, the one or more processors 94 may modify the magnetizing current adjustment to compensate for more than one harmonic order (e.g., the 6$^{th}$ and the 12$^{th}$ harmonics) of the power system 10.

The one or more processors 94 may determine (block 110) a torque current adjustment based at least in part on the reference speed and the measured speed of the motor 16. The torque current adjustment may be determined by the processor 94 of the controller 90 to correct for an error between the reference speed and the measured speed. The one or more processors 94 may then modify (block 112) the torque current adjustment to compensate for the one or more harmonic orders of the power system 10. The torque current adjustment may be modified based at least in part on a transfer function as defined in Equation 16 or 17. For example, if the power system 10 includes a dominant 6$^{th}$ harmonic, the torque current adjustment may be modified based at least in part on the transfer function with h=6. The transfer function may be based at least in part on one or more modeled resonance frequencies determined via Equation 15. In some embodiments, the one or more processors 94 may modify the torque current adjustment to compensate for more than one harmonic order (e.g., the 6$^{th}$ and the 12$^{th}$ harmonics) of the power system 10.

The one or more processors 94 may apply (block 114) reference voltages based at least in part on the modified magnetizing current adjustment and the modified torque current adjustment to the VSD 12. In some embodiments, the modified magnetizing current adjustment may correspond to a direct component of a voltage reference ($V_{ds\_ref}$) the torque current adjustment may correspond to a quadrature component of the voltage reference ($V_{qs\_ref}$) The voltage reference may specify or control one or more operations of the VSD 12. The direct and quadrature components of the voltage reference may be converted to phase values (e.g., using a direct-quadrature to three phase converter) and applied to the VSD 12 to mitigate harmonic interactions of the power system 10.

Figure 7:
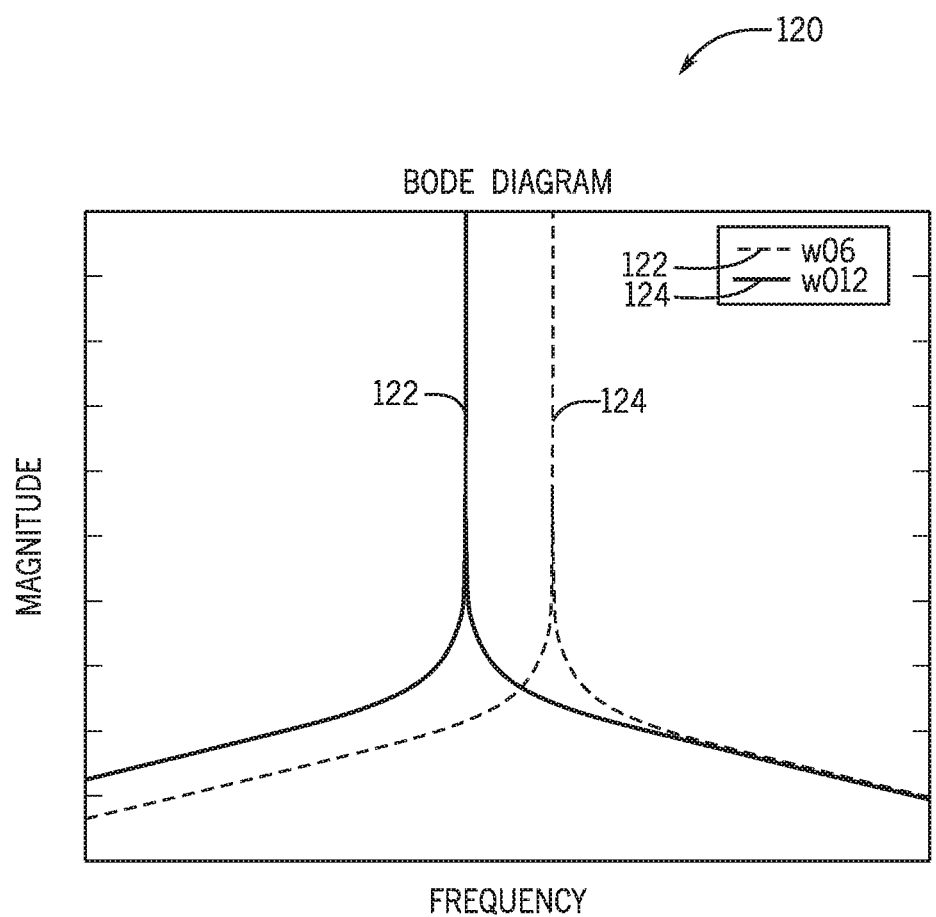
FIG. 7 is a Bode diagram that shows compensation for the resonance frequencies by ideal resonant controllers, in accordance with an embodiment of the present disclosure.

FIG. 7 is a Bode diagram 120 that shows compensation for the resonance frequencies by ideal (modeled) resonant controllers, in accordance with an embodiment of the present disclosure. A first curve 122 represents a frequency response of a first resonant controller tuned for a first harmonic (6*$f_n$). A second curve 124 represents a second resonant controller tuned for a second harmonic (12*$f_n$). Each curve 122, 124 exhibits an infinite gain at a certain frequency representing a resonance frequency, and almost no attenuation outside the resonance frequency.

Reference throughout this specification to "one embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment. Although the present disclosure has been described with respect to specific details, it is not intended that such details should be regarded as limitations on the scope of the present disclosure, except to the extent that they are included in the accompanying claims.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
   determining, via one or more processors, a first magnetizing current component based at least in part on a modeled flux component and a measured flux component of a motor of a power system having one or more transformers, wherein an umbilical cable of the power system is configured to couple the motor, the one or more transformers, and a variable-speed drive, wherein the umbilical cable is configured to operate in a subsea environment, wherein the variable-speed drive is configured to be located at a topside position and the motor and at least one of the one or more transformers is configured to be located at a subsea position;
   determining, via the one or more processors, a second magnetizing current component to compensate for a harmonic order of the power system based on a modeled resonance frequency of the power system;
   determining, via the one or more processors, a first torque current component based at least in part on a modeled speed component and a measured speed component of the motor;
   determining, via the one or more processors, a second torque current component to compensate for the harmonic order of the power system based on the modeled resonance frequency;
   determining, via the one or more processors, one or more reference voltages based at least in part on the first magnetizing current component, the second magnetizing current component, the first torque current component, and the second torque current component, wherein the one or more reference voltages are configured to specify operation of a variable-speed drive coupled to the motor; and
   controlling, via the one or more processors, a magnetizing current and a torque current of the variable-speed drive using the one or more reference voltages.

2. The method of claim 1, wherein the measured flux component is determined based on one or more voltage measurements acquired by one or more sensors coupled to an output of the variable-speed drive.

3. The method of claim 1, wherein the measured speed component is determined based on one or more current measurements acquired by one or more sensors coupled to an output of the variable-speed drive.

4. The method of claim 1, wherein the harmonic order operates between six to twelve times a nominal frequency of the power system.

5. The method of claim 1, wherein the first modeled resonance frequency or the second modeled resonance frequency is determined based at least in part on modeling an input impedance of the power system from the variable-speed drive.

6. The method of claim 1, wherein the modeled resonance frequency is determined based at least in part on an equivalent input impedance of the power system from the variable-speed drive.

7. A system comprising:
a variable-speed drive configured to drive a motor, wherein the variable-speed drive is configured to be located at a topside position and is communicatively coupled to a first resonant controller and a second resonant controller, wherein the motor is configured to be located at a subsea position;
a first transformer configured to couple to the variable-speed drive, wherein the first transformer is configured to be located at the topside position and is configured to increase a first voltage output by the variable-speed drive;
a second transformer configured to couple to the motor, wherein the second transformer is configured to be located at the subsea position and is configured to decrease a second voltage output by the first transformer;
an umbilical cable configured to couple the variable-speed drive, the first transformer, the second transformer, and the motor, wherein the umbilical cable is configured to operate in a subsea environment at a harmonic order of the system, wherein the first resonant controller is configured to compensate for the harmonic order of the system by adjusting a magnetizing current used to control an operation of the variable-speed drive based at least in part on a modeled resonance frequency of the system, wherein the second resonant controller is configured to compensate for the harmonic order of the system by adjusting a torque current used to control the operation of the variable-speed drive based at least in part on the modeled resonance frequency;
a first controller communicatively coupled to the variable-speed drive, wherein the first controller is configured to control the magnetizing current based at least in part on a modeled flux component and a measured flux component of the motor;
a second controller communicatively coupled to the variable-speed drive, wherein the second controller is configured to control a torque current based at least in part on a modeled speed component and a measured speed component of the motor; and
a third controller communicatively coupled to the variable-speed drive, wherein the third controller is coupled in parallel to the first controller, wherein the third controller is configured to compensate for a second harmonic order of the system by adjusting the magnetizing current based at least in part on the modeled resonance frequency.

8. The system of claim 7, comprising one or more sensors configured to couple to an output of the variable-speed drive, wherein the one or more sensors are configured to acquire one or more voltage measurements or one or more current measurements.

9. The system of claim 8, comprising a phase locked loop circuitry configured to extract a transformation angle based at least in part on the one or more voltage measurements to transform direct and quadrature flux components of the one or more voltage measurements to rotating coordinates.

10. The system of claim 7, wherein the first resonant controller is coupled in parallel to the first controller and the second resonant controller is coupled in parallel to the second controller.

11. The system of claim 7, wherein a fourth resonant controller is coupled in parallel to the second controller and the fourth resonant controller is configured to compensate for the second harmonic order of the system by adjusting the torque current based at least in part on the modeled resonance frequency.

12. A tangible, non-transitory, machine-readable medium, comprising machine-readable instructions when executed by one or more processors cause the one or more processors to:
receive a modeled flux component and a modeled speed component of a motor of a power system having one or more transformers;
receive a measured flux component and a measured speed component of the motor;
determine a first magnetizing current component based at least in part on the modeled flux component and the measured flux component;
determine a second magnetizing current component to compensate for a harmonic order of the power system based on a modeled resonance frequency of the power system;
determine a first torque current component based at least in part on the modeled speed component and the measured speed component;
determine a second torque current component to compensate for the harmonic order of the power system based on the modeled resonance frequency;
determine one or more reference voltages based at least in part on the first magnetizing current component, the second magnetizing current component, the first torque current component, and the second torque current component, wherein the one or more reference voltages are configured to specify an operation of a variable-speed drive; and
control a magnetizing current and a torque current of a variable-speed drive coupled to the motor using the one or more reference voltages, wherein an umbilical cable of the power system is configured to couple the motor, the one or more transformers, and the variable-speed drive, wherein the umbilical cable is configured to operate in a subsea environment, wherein the variable-speed drive is configured to be located at a topside position and the motor and at least one of the one or more transformers is configured to be located at a subsea position.

13. The machine-readable medium of claim 12, wherein determining the second magnetizing current component or determining the second torque current component comprises machine-readable instructions configured to cause the one or more processors to model an equivalent circuit of the power system comprising stray capacitance to ground of a step-down transformer and a step-up transformer of the power system.

14. The machine-readable medium of claim 12, wherein determining the second magnetizing current component or determining the second torque current component comprises machine-readable instructions configured to cause the one or more processors to model an equivalent circuit of the power system comprising leakage inductance of a step-down transformer and a step-up transformer of the power system.

15. The machine-readable medium of claim 12, comprising machine-readable instructions configured to cause the one or more processors to:
    determine a reference direct current component based at least in part on the modeled flux component and the measured flux component; and
    determine a reference quadrature current component based at least in part on the modeled speed component and the measured speed component.

16. The machine-readable medium of claim 15, comprising machine-readable instructions configured to cause the one or more processors to:
    determine a first error between the reference direct current component and a measured direct current component; and
    determine a second error between the reference quadrature current component and a measured quadrature current component.

17. The machine-readable medium of claim 12, wherein the harmonic order operates between six to twelve times a nominal frequency of the power system.

18. The system of claim 7, wherein the first resonant controller is configured to execute $$k_p + \frac{k_i}{s}.$$

19. The system of claim 7, wherein the second resonant controller is configured to execute $$\Sigma_h \frac{k_{ih} \cdot s}{s^2 + (\omega \cdot h)^2}.$$

* * * * *